June 10, 1958 — R. E. WILLE — 2,837,822
FOUNTAIN TYPE FEEDING SPOON
Filed Oct. 7, 1957
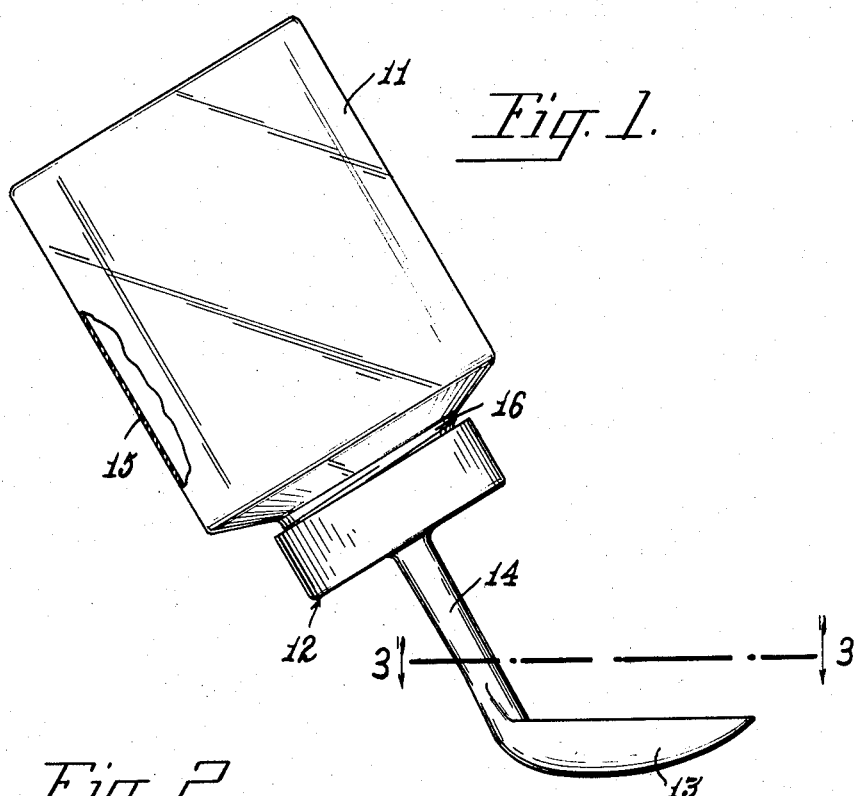
Fig. 1.
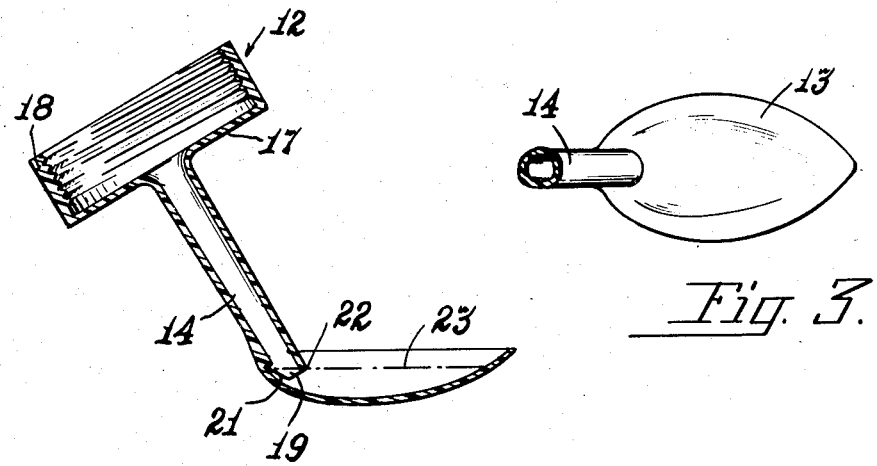
Fig. 2.
Fig. 3.
INVENTOR.
RACHEL E. WILLE United States Patent Office 2,837,822
Patented June 10, 1958

2,837,822
FOUNTAIN TYPE FEEDING SPOON
Rachel E. Wille, Udina-Elgin, Ill.
Application October 7, 1957, Serial No. 688,633
1 Claim. (Cl. 30—125)

The invention relates to improvements in feeding devices and is more particularly concerned with a fountain type feeding spoon intended for use while feeding infants fluid or semi-fluid foods.

More particularly, the invention is concerned with a novelly constructed feeding spoon that is incorporated with a container of the type commonly known as a "squeeze bottle." The bottle or container is fabricated from any suitable plastic material and has a thin manually deformable side wall or wall portion that is easily manipulated so as to afford controlled means to forcibly eject the contents thereof into the bowl of a feeding spoon attached thereto and in communication with the interior thereof. The feeding spoon has an integral hollow stem opening at one end into the shallow concave bowl thereof and is formed at its other end with a cap that may be easily and quickly mounted on and removed from the container.

The construction is such that when a very fluid substance, such as milk or a juice, is placed in the container and the container is held in an inclined position of use, such fluid will flow by gravity into the spoon bowl to an extent that will maintain a predetermined fluid level therein at all times. When semi-fluids, such as semi-liquid solids like vegetables, meats or fruits, processed for infants, is placed in the container, delivery of desired amounts to the spoon bowl, for maintaining a given level therein, is accomplished by periodic squeezing of the container.

It is therefore an object of the invention to provide a novel fountain type feeding device.

Another object is to provide a spoon feeder of the character described with novel means to maintain a predetermined quantity of food in the bowl of a feeding spoon.

Another object is to provide a novelly constructed, inexpensive fountain type feeder which is very efficient in use, easy to fill, and which is not difficult to maintain in a clean sanitary condition.

With the foregoing and other such objects in view, which will appear as the description proceeds, the invention consists of certain novel features of construction, arrangement and combination of parts hereinafter fully described, illustrated in the accompanying drawings, and particularly pointed out in the appended claim, it being understood that various changes in form, proportion, size and minor details of the construction may be made without departing from the spirit of the invention.

Referring to the drawings in which the same characters of reference are employed to identify corresponding parts:

Fig. 1 is a side elevational view of the fountain type feeder, showing it in a position of use, and a part of its container broken away.

Fig. 2 is a longitudinal central sectional view through the cap and its attached spoon bowl.

Fig. 3 is a horizontal sectional view taken on line 3—3 of Fig. 1.

Referring to the accompanying drawings, the feeding device comprises a container 11 and a removable cap 12 having a feeding spoon bowl 13 integrally connected with the cap by means of a hollow stem 14.

The container may be of any size and shape convenient to hold in the hand and preferably has a volume sufficiently large to contain an adequate amount of fluid or semi-fluid for a single feeding.

As illustrated, the container comprises a relatively large diameter body formed of plastic material and having a thin resiliently yieldable circumferential wall 15 adapted to be deformed manually while in use so as to effect discharge of its contents. The container terminates at its open end in an externally threaded collar or flange 16 adapted to have the cap 12 threaded thereon.

The cap 12, which is formed preferably of rigid plastic material, includes a wall 17 having a surrounding internally threaded skirt 18 for engaging the container flange 16, and an outwardly extending axial tubular stem 14 in communication with the interior of the container when the cap is in place thereon. The stem interior may be of uniform diameter, as shown, or it may taper inwardly slightly toward its discharge end. The free or discharge end of the stem 14 has the spoon shaped configuration or bowl 13 formed integral therewith.

Upon referring to Fig. 2, it will be observed that the open free end 19 of the tubular stem 14 is located within the confines of the spoon bowl 13 and that a portion of the stem wall, at said free end, is cut away to define a vent notch 21, the upper end of which is in substantial horizontal alignment with the diametrically opposed edge portion 22 of the stem. The location of this notch end and said edge portion determines the level to which a fluid contained in the bowl 13 may rise when the feeder is held in the position of use shown in Figs. 1 and 2. Otherwise stated, when the feeder is initially placed in feeding position, fluid in the container 11 will flow downwardly through the stem 14 until such time as the fluid in the bowl 13 reaches a level 23 and closes the open end of the stem. At that time, the entrance of replacement air into the container is stopped and further flow into the bowl is prevented. When some or all of the contents of the spoon bowl 13 is removed, as while feeding, the desired fluid level is restored automatically.

The feeder functions in a similar manner when a semi-fluid food, such as finely reduced vegetable solids, is contained therein. However, owing to the viscosity of the semi-fluid food, there is no such free flow as occurs when fluid is dispensed. The level of the semi-fluid substance is maintained, in this instance, by periodically squeezing the container so as to forcibly eject a quantity of the semi-fluid substance. When the pressure on the container is relieved, the wall 15 thereof is restored to its normal extended condition and air is drawn into the container through the stem 14 to replace the dispensed substance. Should an excessive amount of the substance have been dispensed into the spoon bowl, such excess above the level of the vent notch 21 and/or stem edge portion 22, is drawn back into the container. It is therefore always possible to maintain a predetermined substance level in the spoon bowl. Obviously, the above described method for dispensing semi-solid substances may be employed during the dispensing of free flowing fluids.

The structure is such that it is a simple matter to remove the spoon-cap from the container for filling or emptying, or for washing the same to maintain it in a clean sanitary condition.

As many possible embodiments may be made in the invention and as many changes might be made in the embodiment above set forth, it is to be understood that all matters hereinbefore set forth or shown in the accompanying drawings are to be interpreted as illustrative and not in a limiting sense.

Having thus described the invention, what is claimed as new and desired to be secured by Letters Patent is:

A feeder comprising a container for a fluid, said container being open at one end and adapted to be held in an inclined substantially inverted position with its open end disposed downwardly, an externally threaded flange surrounding the open container end, an internally threaded cap mounted on said flange and closing said end, a tubular stem integral with and depending from said cap open at both of its ends and in communication at one end with the container interior, a shallow bowl integral with a portion of the wall of said stem adjacent to its free end and disposed at an obtuse angle to said stem, said free stem end opening into the bowl below the upper perimeter thereof and in a plane at an angle to the plane of said perimeter, and at least one notch opening in the free end of said stem and adjacent to the juncture of the stem with the bowl, said notch being of a length to locate its inner end substantially in horizontal alignment with the opposed edge of the open free end so as to be closed to atmosphere when the level of fluid flowing into the bowl through said stem reaches the level of said opposed edge.

References Cited in the file of this patent

UNITED STATES PATENTS

| | | |
|---|---|---|
| 1,000,178 | Kahl | Aug. 8, 1911 |
| 1,319,376 | Cooper | Oct. 21, 1919 |
| 1,627,804 | Platt | May 10, 1927 |
| 2,252,119 | Edmonds | Aug. 12, 1941 |
| 2,453,525 | McNeill | Nov. 9, 1948 |
| 2,524,125 | Haid | Oct. 3, 1950 |